(12) United States Patent
Namkoong et al.

(10) Patent No.: US 9,588,832 B2
(45) Date of Patent: Mar. 7, 2017

(54) DATA PREPROCESSING DEVICE AND METHOD ASSOCIATED WITH A FAILURE RISK LEVEL OF A TARGET SYSTEM

(71) Applicant: SAMSUNG SDS CO., LTD., Seoul (KR)

(72) Inventors: Young-Hwan Namkoong, Seoul (KR); Jae-Young Lee, Seoul (KR); A-Young Jung, Seoul (KR); Da-Woon Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 192 days.

(21) Appl. No.: 14/503,964

(22) Filed: Oct. 1, 2014

(65) Prior Publication Data

US 2015/0095719 A1   Apr. 2, 2015

(30) Foreign Application Priority Data

Oct. 1, 2013 (KR) ........................ 10-2013-0117263

(51) Int. Cl.
*G06F 11/00* (2006.01)

(52) U.S. Cl.
CPC .................................. *G06F 11/008* (2013.01)

(58) Field of Classification Search
CPC ... G06F 11/008; G06F 11/079; G06F 11/3058
See application file for complete search history.

(56) References Cited

U.S. PATENT DOCUMENTS

| | | | | |
|---|---|---|---|---|
| 7,484,132 B2* | 1/2009 | Garbow | ............... | G06F 11/008 714/26 |
| 7,502,971 B2* | 3/2009 | Cohen | ................... | G06F 11/008 702/186 |
| 7,975,175 B2* | 7/2011 | Votta | ..................... | G06F 11/004 714/13 |
| 2012/0203536 A1* | 8/2012 | Gangemi | ............... | G06F 9/455 703/22 |
| 2012/0209568 A1* | 8/2012 | Arndt | .................. | G06F 11/3089 702/183 |
| 2013/0073911 A1* | 3/2013 | Terris | .................. | G06F 11/0781 714/47.1 |
| 2013/0190095 A1* | 7/2013 | Gadher | ................. | G06F 11/008 463/42 |

\* cited by examiner

*Primary Examiner* — Joseph Kudirka
(74) *Attorney, Agent, or Firm* — Sughrue Mion, PLLC (57) ABSTRACT

There are provided a data preprocessing device and a method thereof. A data preprocessing device according to an embodiment of the present disclosure includes a risk level analyzing unit configured to calculate a failure risk level of a target system using failure history information of the target system and characteristic information of the target system; a collection period setting unit configured to determine a data collection period from the target system according to the calculated failure risk level; and a preprocessing unit configured to preprocess data collected from the target system according to the data collection period.

20 Claims, 4 Drawing Sheets

DATA PREPROCESSING DEVICE AND METHOD ASSOCIATED WITH A FAILURE RISK LEVEL OF A TARGET SYSTEM

CROSS-REFERENCE TO RELATED APPLICATION

This application claims priority to and the benefit of Korean Patent Application No. 10-2013-0117263, filed on Oct. 1, 2013, the disclosure of which is incorporated herein by reference in its entirety.

BACKGROUND

1. Field

Embodiments of the present disclosure relate to a data preprocessing device and a method thereof.

2. Discussion of Related Art

Due to recent computerization of tasks by companies or public organizations, separate data centers are being increasingly built. In general, such a data center includes a plurality of servers configured to perform an assigned task and a separate monitoring device configured to monitor each server and detect a failure thereof.

Since servers included in the data center are generally operated together with the other servers rather than being operated independently, a failure in only some servers can interfere with all operations. Therefore, rapid detection of and response to a failure of each server are very important in operating such a data center. However, in servers constituting such a data center, device components (a central processing unit, a memory, a disk, a file system, and the like), data measurement periods for each component, and types of data to be collected, and the like are very different. Therefore, in order to accurately analyze data collected by separate servers, a preprocessing operation of collecting raw data is necessary.

SUMMARY

Embodiments of the present disclosure are provided to effectively preprocess data obtained from servers having various specifications.

According to an aspect of the present disclosure, there is provided a data preprocessing device. The device includes a risk level analyzing unit configured to calculate a failure risk level of a target system using failure history information of the target system and characteristic information of the target system; a collection period setting unit configured to determine a data collection period from the target system according to the calculated failure risk level; and a preprocessing unit configured to preprocess data collected from the target system according to the data collection period.

The risk level analyzing unit may generate a risk level analysis model including at least one of a regression analysis model, a machine learning model, and a rule-based model based on the failure history information, and the failure risk level of the target system may be calculated by applying the characteristic information of the target system or state information of the target system to the generated risk level analysis model.

The collection period setting unit may determine the data collection period from the target system such that the data collection period decreases as the calculated failure risk level increases.

The collection period setting unit may determine the data collection period from the target system using the calculated failure risk level and predetermined system congestion period information.

The collection period setting unit may set a data collection period within the system congestion period to be smaller than a data collection period outside the system congestion period.

The data preprocessing device may further include a calculation interval setting unit configured to set a calculation interval (time window) for data preprocessing of the preprocessing unit according to a state of the target system.

The calculation interval setting unit may set the calculation interval such that the calculation interval decreases as a central processing unit (CPU) usage rate or an auxiliary memory device usage rate of the target system increases.

The characteristic information of the target system may include at least one of a hardware specification, operation system information, system setting information, and executing software information of the target system.

The data preprocessing may include at least one of normalization, interpolation, imputation, principal component analysis, and statistical analysis of data collected from the target system.

The state information of the target system may include at least one of a central processing unit (CPU) usage rate and an auxiliary memory device usage rate of the target system.

According to another aspect of the present disclosure, there is provided a data preprocessing method. The method includes calculating, by a risk level analyzing unit, a failure risk level of a target system using failure history information of the target system and characteristic information of the target system; determining, by a collection period setting unit, a data collection period from the target system according to the calculated failure risk level; and performing, by a preprocessing unit, preprocessing on data collected from the target system according to the data collection period.

The analyzing of the risk level may further include generating a risk level analysis model including at least one of a regression analysis model, a machine learning model, and a rule-based model based on the failure history information; and calculating a failure risk level of the target system by applying characteristic information of the target system or state information of the target system to the generated risk level analysis model.

In the determining of the collection period, the data collection period from the target system may be determined such that the data collection period decreases as the calculated failure risk level increases.

In the determining of the collection period, the data collection period from the target system may be determined using the calculated failure risk level and predetermined system congestion period information.

In the determining of the collection period, a data collection period within the system congestion period may be set to be smaller than a data collection period outside the system congestion period.

The data preprocessing method may further include setting, by a calculation interval setting unit, a calculation interval (time window) for data preprocessing of the preprocessing unit according to a state of the target system, before the preprocessing is performed.

In the setting of the calculation interval, the calculation interval may be set such that the calculation interval decreases as a CPU usage rate or an auxiliary memory device usage rate of the target system increases.

The characteristic information of the target system may include at least one of a hardware specification, operation system information, system setting information, and executing software information of the target system.

The data preprocessing may include at least one of normalization, interpolation, imputation, principal component analysis, and statistical analysis of data collected from the target system.

The state information of the target system may include at least one of a central processing unit (CPU) usage rate and an auxiliary memory device usage rate of the target system.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present disclosure will be described in detail with reference to the drawings. However, these are only examples and the present disclosure is not limited thereto.

In descriptions of the present disclosure, when it is determined that detailed descriptions of related well-known functions unnecessarily obscure the gist of the present disclosure, detailed descriptions thereof will be omitted. Some terms described below are defined by considering functions in the present disclosure and meanings may vary depending on, for example, a user or operator's intentions or customs. Therefore, the meanings of terms should be interpreted based on the scope throughout this specification.

The spirit and scope of the present disclosure are defined by the appended claims. The following embodiments are only made to efficiently describe the technological scope of the present disclosure to those skilled in the art.

Figure 1:
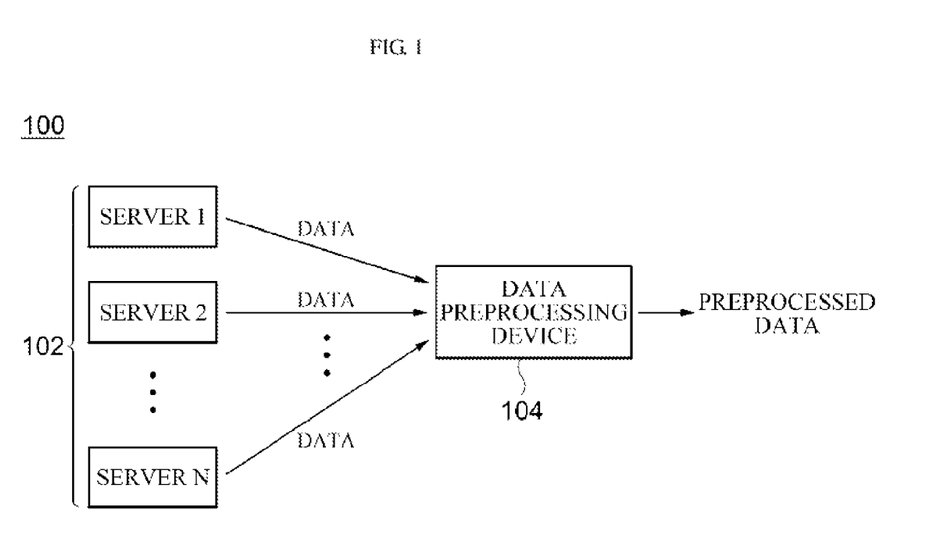
FIG. 1 is a block diagram illustrating a data collection system 100 according to an embodiment of the present disclosure.

FIG. 1 is a block diagram illustrating a data collection system 100 according to an embodiment of the present disclosure. The data collection system 100 according to the embodiment of the present disclosure refers to a system configured to collect data that may be used to recognize performance or a current state of each server from at least one server and monitor states of servers based on the collected data. As illustrated, the data collection system 100 according to the embodiment of the present disclosure includes one or more servers 102 and a data preprocessing device 104.

The one or more servers 102 is a computer system including a central processing unit (CPU), an auxiliary memory device (memory), and the like, and may be, for example, a group of computer devices included in a data center of a company and the like. However, in the embodiment of the present disclosure, a type of the servers 102 is not specifically limited and may include all types of computer devices that have a configuration the same as or similar to a general computer and perform assigned operations.

The data preprocessing device 104 collects data from the at least one servers 102 periodically. The information collected by the data preprocessing device 104 from the servers 102 may include all types of information that may be generally collected from a computer device in order to recognize a state of a corresponding computer device, for example, a CPU usage rate, a CPU run queue, a memory usage rate, and a system temperature. The data processing device 104 may include a CPU in an exemplary embodiment.

In addition, the data preprocessing device 104 preprocesses the collected data in order to analyze the collected data. In general, the servers 102 of the data center and the like have various hardware configurations (for example, a CPU, a memory, a disk, a file system, and the like). Also, items that may be measured for each piece of hardware are highly diverse and subdivided, and a measurement method thereof is also different in many cases. For example, according to various properties such as a CPU usage rate, a waiting time, and a run queue, performance measurement data may be collected in the CPU. Therefore, when the collected data is directly used, since it is difficult to accurately compare states of servers having different hardware, the data preprocessing device 104 performs conversion such that each piece of data may be compared based on the same criteria through an appropriate preprocessing process of the collected data. The preprocessing process of the data will be described in detail below. Hereinafter, in order to distinguish preprocessed data, the data collected from the servers 102 (that is, data before preprocessing) is called "raw data."

Figure 2:
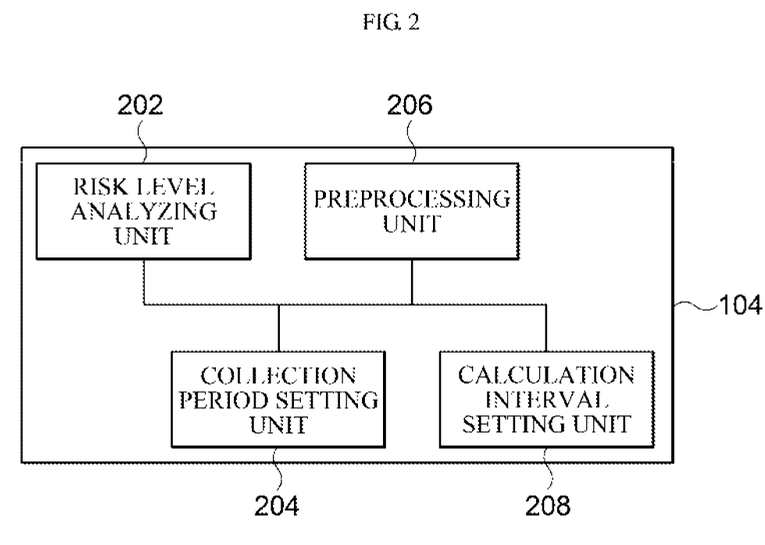
FIG. 2 is a block diagram illustrating a detailed configuration of a data preprocessing device 104 according to an embodiment of the present disclosure.

FIG. 2 is a block diagram illustrating a detailed configuration of the data preprocessing device 104 according to an embodiment of the present disclosure. As illustrated, the data preprocessing device 104 according to the embodiment of the present disclosure includes a risk level analyzing unit 202, a collection period setting unit 204, and a preprocessing unit 206, and may further include a calculation interval setting unit 208 as necessary.

The risk level analyzing unit 202 calculates a failure risk level of each of the servers 102 using failure history information of the at least one servers 102 and characteristic information of each of the servers 102. First, the risk level analyzing unit 202 generates a risk level analysis model for each of the servers 102 based on previous failure history information collected from each of the servers 102. In embodiments of the present disclosure, the failure risk level of the server refers to a quantified possibility of actual occurrence of a failure in a corresponding server. In order to analyze the failure risk level, various analysis techniques such as a regression analysis model, a machine learning model, and a rule-based model may be used. However, embodiments of the present disclosure are not limited to a specific analysis model or technique. Various analysis models including methods known in the related art may be used to calculate the failure risk level for each server.

In an embodiment, the risk level analyzing unit 202 may configure the risk level analysis model as a plurality of rules. For example, the risk level analyzing unit 202 may generate a plurality of rules that define a risk level when a specific hardware specification or a specific server state is set as a condition, and calculate a risk level of each of the servers 102 according to a corresponding rule. In addition, the risk level analyzing unit 202 may be configured to calculate a failure risk level of each of the servers 102 using various risk level analysis models and criteria in consideration of characteristics of the servers 102, characteristics of assigned operations, and the like.

When the risk level analysis model is generated as described above, the risk level analyzing unit 202 may calculate a failure risk level of the servers 102 by applying system characteristic information or current state information of the servers 102 to the generated risk level analysis model. In this case, the system characteristic information may include a hardware specification, operation system information, system setting information, executing software information, and the like of each of the servers 102. For example, according to the risk level analysis, in the servers 102 having specific hardware, it is possible to derive a result showing that there is a high correlation between a temperature of the specific hardware and failure occurrence of the servers 102. In this case, the risk level analyzing unit 202 may calculate a failure risk level of the servers 102 based on information on a temperature measured from the specific hardware.

The collection period setting unit 204 determines a data collection period of each of the servers 102 according to the failure risk level calculated in the risk level analyzing unit 202. In an embodiment, the collection period setting unit 204 may set the data collection period of each of the servers 102 such that the data collection period decreases as the calculated failure risk level increases. This is because it is only possible to smoothly respond to detection of an abnormal system sign in advance if a constantly changing situation is quickly recognized.

Also, the collection period setting unit 204 may determine the data collection period of each of the servers 102 using predetermined system congestion period information in addition to the calculated failure risk level. For example, the risk level analyzing unit 202 may analyze the data previously collected from each of the servers 102 using a time series analysis technique and the like and recognize a time interval in which each of the servers 102 has a high system load. Accordingly, the collection period setting unit 204 sets the data collection period of the time interval in which each of the servers 102 has a high system load to be relatively smaller so that a state of each of the servers 102 may be collected in a faster cycle. That is, in the embodiment of the present disclosure, the collection period setting unit 204 may determine the data collection period of each of the servers 102 in consideration of at least one piece of information of the failure risk level of each of the servers 102 and the congestion period information for each of the servers 102. Also, when the failure risk level of each of the servers 102 is changed, the collection period setting unit 204 may adaptively change a predetermined data collection period by reflecting the change.

The preprocessing unit 206 preprocesses data collected from each of the servers 102 according to the data collection period determined by the collection period setting unit 204. In the embodiment of the present disclosure, preprocessing of raw data collected from each of the servers 102 may include at least one of normalization, interpolation, imputation, principal component analysis, and statistical analysis of the raw data.

In an embodiment, the preprocessing unit 206 may perform normalization on the raw data collected from each of the servers 102. In order to detect an abnormal sign of each of the servers 102 in advance using the data collected from each of the servers 102, correlation analysis within the collected data is necessary. However, various types of collected data have different ranges of a unit and a level according to each measurement item. Therefore, the preprocessing unit 206 may find a range of data based on a maximum value/minimum value for each data item and normalize the data based on this range so that each piece of data may be analyzed based on the same criteria.

Also, when a preprocessing operation is performed, the preprocessing unit 206 may set a small grace period (for example, about 1 minute) before each piece of collected data is preprocessed. In order to accurately analyze each piece of collected data, comparison of data collected at the same time is necessary. However, transmission of some data may be delayed due to a network delay and the like.

The data preprocessing performed in the preprocessing unit 206 may include, for example, the following operations.

1. Data cleaning and transformation

Missing value replacement: a corresponding tuple is ignored, a missing value is calculated based on a rule, and a process is performed by a professional.

Smoothing: in order to remove noise data, data deviating from an overall trend is transformed to satisfy the trend.

Normalization: a process of providing overall uniformity to data includes min/max normalization, z-score, decimal scaling, and the like.

Aggregation: data is summarized and a cube is generated (mainly used in a data warehouse)

Outlier detection and removal: data having characteristics different from most of other data in a data set is classified and removed.

Main technique: clustering, a statistical estimation technique (for example: Grubbs' test), and the like are used.

2. Data integration and inconsistency solving

Various log files/databases are integrated, and transformation to a data type having consistency is performed.

Main problems and solutions

1) Duplication problem: refers to a state in which data having the same content is stored under a different name, and duplicated data is detected through correlation analysis and the like.

2) Consistency problem: refers to a case in which a value that may be obtained through calculation/statistics is wrong, and a previously calculated value is verified through separate calculating.

3) Different expression problem: refers to a case in which data uniformity is absent due to different metering/measuring units, and the problem is solved through an expression matching process.

4) Finding and solving problem through correlation analysis between data: as an analysis result value is closer to 0, the data is determined as less relevant.

3. Data reduction or Expression Feature Extraction a process of obtaining data that accurately represents an overall data set with a small amount.

it is necessary to improve efficiency when mass data is analyzed.

Dimension reduction method: a process of finding a minimum set by removing a duplication attribute and an attribute irrelevant to analysis (stepwise forward selection and stepwise backward elimination)

Reducing a storage size through data encoding and conversion: a lossy or lossless compression technique is used.

Discrete wavelet transformation (DWT): it is a linear signal processing technique, collected data is converted into vectors (wavelet coefficients) that have the same length but the number thereof is different, a vector having the greatest influence is selected from among a plurality of vectors and the other vectors are removed.

Principal component analysis (PCA): compression is performed through a method of selecting and combining data vectors in a Cartesian plane that best represent data, and finding a different small set. A calculating operation is simple and unaligned attributes may also be processed. It is possible to process poor data or uniform data.

In general, the PCA is beneficial for processing poor data, and the DWT is beneficial for processing high-dimensional data.

Next, the calculation interval setting unit 208 sets a calculation interval (time window) for preprocessing of the data collected from each of the servers 102. In the embodiment of the present disclosure, the calculation interval refers to an interval of raw data used for preprocessing of data. For example, it is assumed that the preprocessing unit 206 performs preprocessing in which an average value of specific data is calculated. In this case, when a set calculation interval is 1 minute, an average value is calculated using data obtained for 1 minute from the calculation time, and when a set calculation interval is 5 minutes, an average value is calculated using data obtained for 5 minutes from the calculation time.

In the embodiment of the present disclosure, the calculation interval setting unit 208 may flexibly set the calculation interval for the preprocessing according to a current state of each of the servers 102. For example, when either a CPU usage rate or an auxiliary memory device (for example, a memory) usage rate of any of the servers 102 is more than a reference value, the calculation interval setting unit 208 may determine that a system failure risk level is high and set the calculation interval to be smaller. Also, the calculation interval setting unit 208 recognizes a current state of each of the servers 102 based on a failure risk level for each of the servers 102 calculated in the risk level analyzing unit 202, and accordingly, may adaptively change the calculation interval. In this manner, when the calculation interval decreases, since a preprocessing result may be generated more densely than in the collection period of the raw data, it may compensate for information loss due to a relatively long collection period. On the other hand, when an idle state of the servers 102 continues, in other words, when a usage rate of the CPU or the memory is a specific value or less, the calculation interval setting unit 208 may set the calculation interval to be greater. In this case, an overall preprocessing calculation result is represented as a result (having generality rather than locality) that is relatively summarized compared to raw log data.

Figure 3:
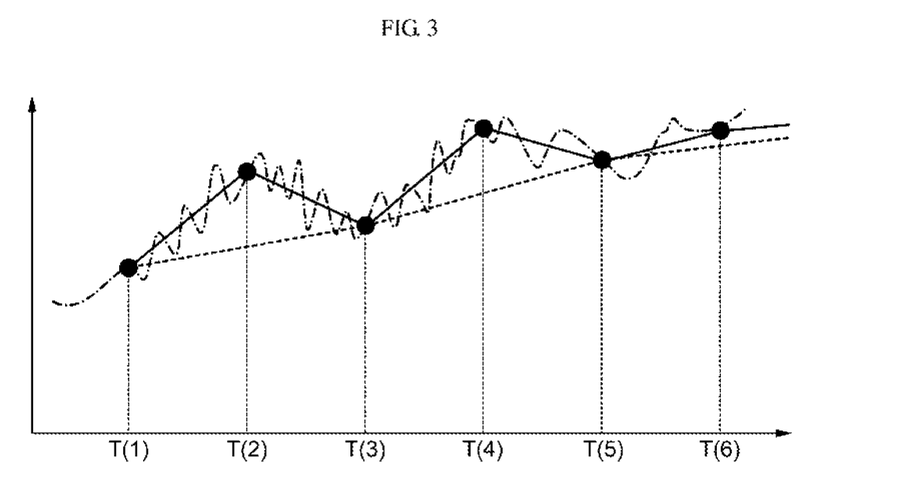
FIG. 3 is a graph illustrating an effect resulting from a change in calculation intervals in a calculation interval setting unit 208 according to an embodiment of the present disclosure.

FIG. 3 is a graph illustrating an effect resulting from a change in calculation intervals in the calculation interval setting unit 208 according to an embodiment of the present disclosure. In the illustrated embodiment, an example in which raw data is interpolated using a linear interpolation method is shown. In the illustrated graph, X-axis represents time and Y-axis represents information collected from the servers 102. As described above, the information may be a CPU usage rate, a CPU run queue, a memory usage rate, and a system temperature, etc. The linear interpolation method is a method in which, when there are two arbitrary points in a coordinate plane, the two points are connected by a straight line. In the illustrated example, an alternated long and short dash line represents actual data, a solid line represents interpolated data when the calculation interval is short, and a dotted line represents interpolated data when the calcula-
tion interval is long. As can be seen in the drawing, a similarity with actual data when the calculation interval is short is higher than when the calculation interval is long.

Meanwhile, the data preprocessing device 104 according to the embodiment of the present disclosure may further include a database (not illustrated). The database may store and manage information on a data collection period, a calculation interval, and a previous failure history of each of the servers 102, a hardware specification of each of the servers 102, and the like in addition to the preprocessing result of the raw data performed in the preprocessing unit 206. The stored information may be used as reference data for risk level analysis, collection period setting, and calculation interval setting for each of the servers 102.

Figure 4:
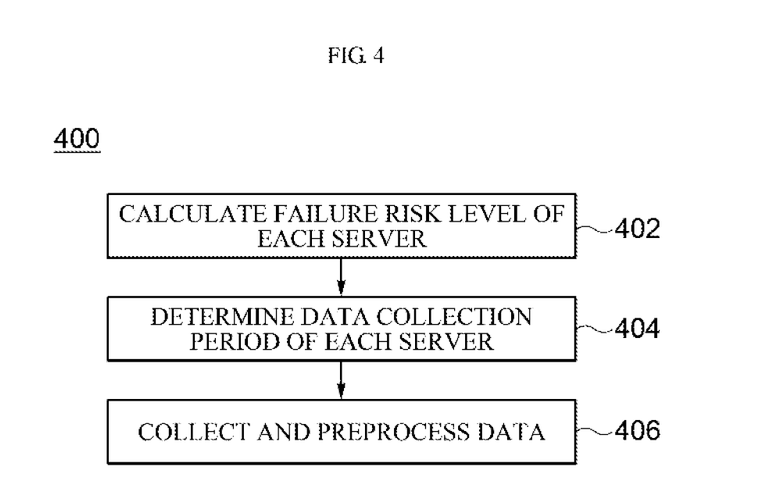
FIG. 4 is a flowchart illustrating a data preprocessing method 400 according to an embodiment of the present disclosure.

FIG. 4 is a flowchart illustrating a data preprocessing method 400 according to an embodiment of the present disclosure. While the flowchart illustrates that the series of operations are performed sequentially, this is only an example, and it should be noted that at least some operations may be simultaneously performed or performed in a different order.

In operation 402, the risk level analyzing unit 202 calculates a failure risk level of each of the servers 102 using failure history information of each of the servers 102 and characteristic information of each of the servers 102. In this case, the operation 402 may further include an operation of generating a risk level analysis model including at least one of a regression analysis model, a machine learning model, and a rule-based model based on the failure history information, and an operation of calculating a failure risk level of each of the servers 102 by applying characteristic information or state information of each of the servers 102 to the generated risk level analysis model. The characteristic information of each of the servers 102 may include at least one of a hardware specification, operation system information, system setting information and executing software information of each of the servers 102.

In operation 404, the collection period setting unit 204 determines the data collection period of each of the servers 102 according to the calculated failure risk level. In an embodiment, in the operation 404, the data collection period of each of the servers 102 may be determined to be smaller as the failure risk level calculated in the operation 402 increases.

Also, in the operation 404, the calculated failure risk level and predetermined system congestion period information may be used to determine the data collection period of each of the servers 102. In this case, a data collection period within the system congestion period may be set to be smaller than a data collection period outside the system congestion period.

In operation 406, the preprocessing unit 206 preprocesses the data collected from each of the servers 102 according to the data collection period determined in the operation 404. A detailed operation of the data preprocessing process is described above.

Also, before the operation 406 is performed, an operation of the calculation interval setting unit 208 setting a calculation interval (time window) for data preprocessing of the preprocessing unit 206 according to a state of each of the servers 102 may be added. The state information may include at least one of a CPU usage rate or an auxiliary memory device usage rate of each of the servers 102. Also, in this case, the calculation interval setting unit 208 may set the calculation interval of each of the servers 102 such that the calculation interval corresponding to the servers 102 decreases as the CPU usage rate or the auxiliary memory device usage rate of each of the servers 102 increases.

According to embodiments of the present disclosure, it is possible to convert data having various types collected from different servers according to various collection periods into information having uniformity and consistency.

Also, according to embodiments of the present disclosure, a data collection period of each server is dynamically changed according to characteristics, states, predetermined congestion time interval information, and the like of each server. Therefore, it is possible to decrease a load on each server and maintain an optimal state of a capacity of the data to be collected.

Also, according to embodiments of the present disclosure, a calculation interval (time window) for preprocessing is adaptively regulated in consideration of a current state of each server. Therefore, it is possible to efficiently recognize a change in states and abnormality of each server.

Meanwhile, the embodiment of the present disclosure may include a computer readable recording medium including a program for executing methods described in this specification in a computer. The computer readable recording medium may include a program instruction, a local data file, and a local data structure, and/or combinations thereof. The medium may be specially designed and prepared for the present disclosure or a generally available medium in the field of computer software may be used. Examples of the computer readable recording medium include magnetic media such as a hard disk, a floppy disk, and a magnetic tape, optical media such as a CD-ROM and a DVD, magneto-optical media such as a floptical disk, and a hard device such as a ROM, a RAM, and a flash memory that is specially made to store and perform the program instruction. Examples of the program instruction may include a machine code generated by a compiler and a high-level language code that can be executed in a computer using an interpreter.

While the present disclosure has been described above in detail with reference to representative embodiments, it may be understood by those skilled in the art that the embodiment may be variously modified without departing from the scope of the present disclosure.

Therefore, the scope of the present disclosure is defined not by the described embodiment but by the appended claims, and encompasses equivalents that fall within the scope of the appended claims.

What is claimed is:

1. A data preprocessing device, comprising:
a risk level analyzing unit configured to calculate a failure risk level of a target system using failure history information of the target system and characteristic information of the target system;
a collection period setting unit configured to determine a data collection period pertaining to the target system according to the calculated failure risk level; and
a preprocessing unit configured to preprocess data collected from the target system during the data collection period,
wherein the failure risk level refers to a quantified possibility of actual occurrence of a failure in the target system, and
wherein one or more of the risk level analyzing unit, the collection period setting unit, and the preprocessing unit are implemented via a central processing unit (CPU).

2. The data preprocessing device of claim 1, wherein:
the risk level analyzing unit is further configured to generate, based on the failure history information, a risk level analysis model including at least one from among a regression analysis model, a machine learning model, and a rule-based model, and
the failure risk level of the target system is calculated by applying the characteristic information of the target system or state information of the target system to the generated risk level analysis model.

3. The data preprocessing device of claim 2, wherein the characteristic information of the target system includes at least one from among a hardware specification, operation system information, system setting information, and software execution information of the target system.

4. The data preprocessing device of claim 2, wherein the state information of the target system includes at least one from among a central processing unit (CPU) usage rate and an auxiliary memory device usage rate of the target system.

5. The data preprocessing device of claim 1, wherein the collection period setting unit is further configured to set the data collection period pertaining to the target system such that a length of the data collection period decreases as the calculated failure risk level increases, thereby allowing for efficient calculation of a failure risk level of the target device.

6. The data preprocessing device of claim 1, wherein the collection period setting unit is further configured to determine the data collection period pertaining to the target system using the calculated failure risk level and a predetermined system congestion period.

7. The data preprocessing device of claim 6, wherein the collection period setting unit is further configured to set a length of a data collection period within the predetermined system congestion period, to be smaller than a length of a data collection period outside the predetermined system congestion period.

8. The data preprocessing device of claim 1, further comprising
a calculation interval setting unit configured to set a calculation interval for data preprocessing performed by the preprocessing unit according to a state of the target system, before the preprocessing is performed.

9. The data preprocessing device of claim 8, wherein the calculation interval setting unit is further configured to set the calculation interval such that the calculation interval decreases as a central processing unit (CPU) usage rate or an auxiliary memory device usage rate of the target system increases.

10. The data preprocessing device of claim 1, wherein the data preprocessing includes at least one from among normalization, interpolation, imputation, principal component analysis, and statistical analysis of the data collected from the target system,
wherein when the data preprocessing includes interpolation of the data collected from the target system, said interpolation provides interpolated data which features better similarity with actual data when the calculation interval is short compared to when the calculation interval is longer than the short calculation interval.

11. A data preprocessing method, comprising:
calculating, by a risk level analyzing unit, a failure risk level of a target system using failure history information of the target system and characteristic information of the target system;
determining, by a collection period setting unit, a data collection period pertaining to the target system according to the calculated failure risk level; and performing, by a preprocessing unit, preprocessing on data collected from the target system during the data collection period, wherein the failure risk level refers to a quantified possibility of actual occurrence of a failure in the target system, and wherein one or more of the risk level analyzing unit, the collection period setting unit, and the preprocessing unit are implemented via a central processing unit (CPU).

12. The data preprocessing method of claim 11, wherein calculating the failure risk level further includes:

generating, based on the failure history information, a risk level analysis model including at least one from among a regression analysis model, a machine learning model, and a rule-based model; and calculating a failure risk level of the target system by applying the characteristic information of the target system or state information of the target system to the generated risk level analysis model.

13. The data preprocessing method of claim 12, wherein the characteristic information of the target system includes at least one from among a hardware specification, operation system information, system setting information, and software execution information of the target system.

14. The data preprocessing method of claim 12, wherein the state information of the target system includes at least one from among a central processing unit (CPU) usage rate and an auxiliary memory device usage rate of the target system.

15. The data preprocessing method of claim 11, wherein, in the determining of the data collection period, the data collection period pertaining to the target system is determined such that the data collection period decreases as the calculated failure risk level increases.

16. The data preprocessing method of claim 11, wherein, in the determining of the data collection period, the data collection period pertaining to the target system is determined using the calculated failure risk level and a predetermined system congestion period.

17. The data preprocessing method of claim 16, wherein, in the determining of the data collection period, a data collection period within the predetermined system congestion period is set to be smaller than a data collection period outside the predetermined system congestion period.

18. The data preprocessing method of claim 11, further comprising setting, by a calculation interval setting unit, a calculation interval for data preprocessing performed by the preprocessing unit according to a state of the target system, before the preprocessing is performed.

19. The data preprocessing method of claim 18, wherein, in the setting of the calculation interval, the calculation interval is set such that the calculation interval decreases as a CPU usage rate or an auxiliary memory device usage rate of the target system increases.

20. The data preprocessing method of claim 11, wherein the data preprocessing includes at least one from among normalization, interpolation, imputation, principal component analysis, and statistical analysis of the data collected from the target system.

* * * * *